United States Patent [19]
Awad et al.

[11] Patent Number: 5,484,624
[45] Date of Patent: Jan. 16, 1996

[54] METHOD FOR REDUCTION OF CHOLESTEROL IN EGG MATERIALS

[75] Inventors: Aziz C. Awad, Westland; Denise M. Smith, DeWitt, both of Mich.

[73] Assignee: Board of Trustees operating Michigan State University, East Lansing, Mich.

[21] Appl. No.: 414,800

[22] Filed: Mar. 31, 1995

[51] Int. Cl.$^6$ .................................................. A23L 1/32
[52] U.S. Cl. ........................... 426/614; 426/422; 426/480
[58] Field of Search .................................. 426/614, 422, 426/425, 480

[56] References Cited

U.S. PATENT DOCUMENTS

| | | |
|---|---|---|
| 3,076,715 | 2/1963 | Greenfield . |
| 3,563,765 | 3/1971 | Melnick . |
| 4,103,040 | 10/1978 | Frioriti . |
| 4,880,573 | 11/1989 | Courregelongue et al. ............ 426/417 |
| 4,980,180 | 4/1990 | Cully . |
| 5,037,661 | 11/1991 | Merchant . |
| 5,063,077 | 5/1991 | Vollbrecht . |
| 5,223,295 | 2/1993 | Maffrand . |
| 5,292,546 | 1/1994 | Cully . |

FOREIGN PATENT DOCUMENTS

| | | |
|---|---|---|
| 2035156 | 1/1992 | Canada . |
| 2050031 | 2/1992 | Canada . |
| 0326469 | 4/1989 | European Pat. Off. . |
| 9111114 | 3/1991 | WIPO . |
| 9324022 | 2/1993 | WIPO . |

OTHER PUBLICATIONS

USDA, Nutrient content of foods, handbook 8–1, 137–145 (1991).
Froning, G W et al., J. Food Sci. 55:95–98 (1990).
Singer, N S et al., Paper No. 63, presented at the 53rd Annual Meeting of Inst. of Food Technologists, Chicago, Illinois, Aug. 8–15, (1993).
Dehal, S. S. et al., A Novel Method to Decrease the Cholesterol Content of Foods, Fat and Cholesterol Reduced Foods (1991).
Szejtli, J., Industrial applications of cyclodextrins. Inclusion Compound 3:331–390 (1984).
Fletcher, D. L., et al., Poultry Sci. 63:1759–1763 (1984).
Adams, L. M., et al., J. Assoc. Off. Anal. Chem. 66: 844–846 (1986).
Monahan, et al., J. Agric. Food Chem. 40:1310 (1992).
Norris, M. E., et al., Appendix II in Recommended Methods for Analysis of Eggs and Poultry Meat, North Central Regional Research Publication #307 (1986).
Gill, J. L., Design and Analysis of Experiments in the animal and Medical Sciences. Iowa State Univ. Press, Ames, Iowa (1978).
Burley, R. W., et al., Can. J. Biochem. Physiol. 39:1295–1307 (1961).
Woodward, S. A., et al., J. Food Sci. 48:501 (1983).
Causeret, D., et al., J. Food Sci. 56:1532–1536 (1991).
Seidman, W. E., et al., Poultry Sci. 43:406–417 (1962).

*Primary Examiner*—Anthony J. Weier
*Attorney, Agent, or Firm*—Ian C. McLeod

[57] ABSTRACT

A method to extract egg material cholesterol and esters thereof based on the specific affinity of a cyclodextrin, particularly β-cyclodextrin. The method consists of a sequence of steps: pH adjustment, dilution with distilled water, heating, mixing, cooling, and centrifugation. The method removed about 95–96% of total egg yolk cholesterol and esters without removing or damaging other egg yolk components. Protein solubility, sponge cake volume and color were the same for a control and the reduced cholesterol egg material.

17 Claims, 5 Drawing Sheets

CHOLESTEROL

FIG. 1A

CHOLESTEROL STEARATE

FIG. 1B

Liquid egg yolk

Adjust pH to 9.00 with 1 N KOH

Water:solid ratio (w/w)    3.00

Heat to 50°C

Add β-cyclodextrin
(β-cyclodextrin:cholesterol mole ratio 4:1)

Mix for 10.5 min , 1000-1600 rpm, at 50°C
using Omnimixer homoginizer (model 17105)

Cool to 8-10°C (within 1 hr)

Centrifuge at 1080 × g (10 min, 5°C)

Pellet                                      Supernatant

Liquid egg yolk

↓

Adjust the pH to 10.5 with KOH

↓

Water to solid (w/w) = 2.9

↓

Heat to 50°C

↓

Add β-cyclodextrin
β-cyclodextrin:cholesterol (m/m) = 4.84

↓

Mix for 6.5 min. at 1500 to 1800 rpm
using Omnimixer homoginizer(Model 17105) at a setting speed of 1 to 1.5

↓

Cool to 8 -10°C
(within 1 hr)

↓

Centrifuge at 8700 × g
(10 min at 5°C)

↙         ↘
Pellet (discard)     Supernatant (save)

↓

Adjust pH to 6.0 with 1 N HCL

↓

Concentrate to 50 % solids

FIG. 7

METHOD FOR REDUCTION OF CHOLESTEROL IN EGG MATERIALS

BACKGROUND OF THE INVENTION

(1) Field of the Invention

The present invention relates to an improved method for the reduction of cholesterol in egg materials using a cyclodextrin as a clathrating agent. In particular, the present invention relates to a method wherein a mixture of the egg material with an alkali metal hydroxide (Na or K) with heating is used to clathrate the cholesterol with the cyclodextrin and then the mixture is cooled to precipitate the clathrate which is removed.

(2) Description of Related Art

High serum cholesterol levels, high blood pressure, and abnormal electrocardiograms (ECG) are important contributing factors to heart attacks. These factors were known before the effects of smoking, obesity, and lack of exercise. One of the most consistent findings in cardiovascular studies is that high levels of plasma cholesterol are associated with atherosclerosis and thereby enhance the risk of coronary heart disease (CHD). This effect is usually mediated through the plasma low density lipoproteins (LDL), which are the most atherogenic lipoproteins.

The major causes of high serum cholesterol are due to genetic disorders, heterozygous familial hypercholesterolemia (FH), and a habitual diet high in saturated fat, calories, and cholesterol. Health experts and physicians generally agree that dietary management is the initial step in the treatment of hypercholesterolemia and hyperlipidemia. This applies even when later drug therapy is required. Changes in diet, serum cholesterol and CHD of an immigrant population have provided convincing evidence that diet plays a major role. The situation has become more complicated due to the controversial aspect of the dietary management of hypercholesterolemia and hyperlipidemia. The food industry has in recent years attempted to reduce fat and cholesterol in a wide variety of food products.

PCT WO91/11114 (1991) to Oakenfull et al describes the removal of cholesterol from egg products using cyclodextrins to form a complex at temperatures between 20° and 60° C. and then chilling to precipitate the cholesterol-cyclodextrin complex. In this process, there is no pH adjustment of the aqueous egg material. The removal of cholesterol was less than 90%. U.S. Pat. No. 5,223,295 (1993) to Maffrand et al describes a similar process.

U.S. Pat. No. 5,063,077 (1991) to Vollbrecht et al describes the use of a solid absorbing agent to remove cholesterol from egg materials. β-cyclodextrin is particularly used for this purpose. Egg granules are removed from the egg material prior to treatment in this process. After removing cholesterol, the granule and plasma fractions are recombined. There is considerable residual cholesterol in the product.

U.S. Pat. No. 5,292,546 (1994) to Cully et al describes a process wherein aqueous egg materials are treated with sodium chloride or ammonium carbonate at temperatures of less than about 10° C. The problem is that with sodium chloride a residue is left in the egg material. Ammonium carbonate is removed with a vacuum which is an expensive step. Canadian Patent Application No. 2,050,031 to Cully et al describes a similar process.

PCT WO93/24022 (1993) to Hedges et al describes a process wherein the residual cyclodextrin in a food is heated at 40° to 80° C. with CGTase and an amylase in water to hydrolyze the cyclodextrin. This reference recognizes the problem of the cyclodextrin in the food.

U.S. Pat. No. 4,980,180 (1990) to Cully et al describes a method for removal of β-cyclodextrin from egg materials using β-amylases. The patent recognizes the problem of incomplete removal of the cyclodextrins at the lead of the prior art processes.

Mentink Canadian Application 2,035,156 (1991) describes in Example 1 the long heating for 5 hours of fatty acids in butter with a cyclodextrin in an aqueous solution without pH adjustment at 40° C. to complex cholesterol. The fatty layer separates from the water. The cyclodextrin/cholesterol complex is treated by heating in an aqueous solution at high temperatures to separate the cholesterol.

Thus the prior art has recognized the need to remove cholesterol from egg yolk without removing or damaging those components responsible for functionality. Such a method could be used by food and pharmaceutical companies wishing to prepare egg products with reduced cholesterol content. There is a need to develop an efficient and simple process to extract the cholesterol from liquid egg yolk using β-cyclodextrin, without removing or damaging the other yolk components.

Egg yolk is a complex mixture of particles held in suspension in a protein (livetin) solution. The types of particles are: yolk spheres, granules, profiles or low density lipoproteins, and myelin figures.

The granules are the major components of the yolk and represent 25% of the dry weight. They are sedimented, after diluting the yolk with an equal volume of aqueous NaCl solution (1% w/v) and centrifuging the resulting mixture at 10,000×g for 45 min. Granules are smaller and more numerous than the yolk spheres. The majority of granules have a diameter between 1.0 and 1.3 μm. Granules contain about 70% lipovitellins, 16% phosvitin, and 12% low density lipoprotein (LDL). Granules are disassociated by a 0.6M NaCl solution and at pH 3 and 9.

Figure 1A:
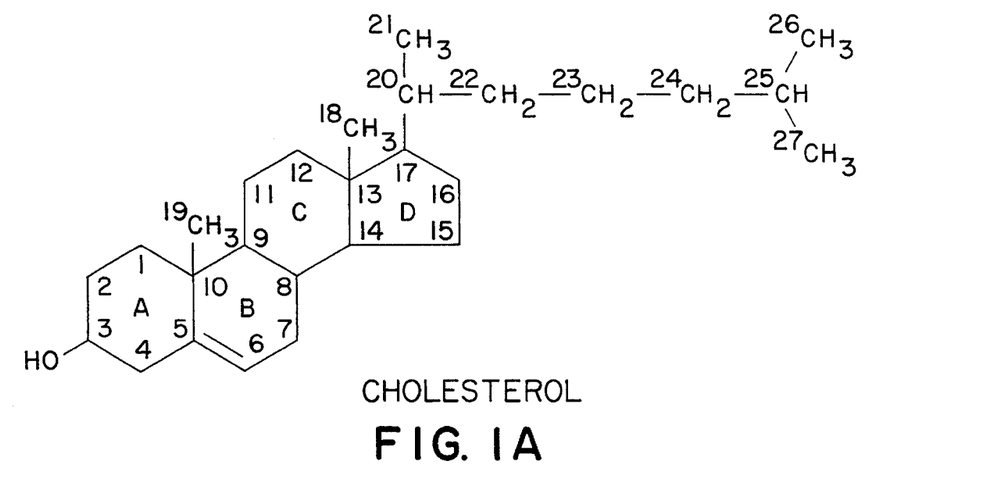
FIGS. 1A and 1B show the molecular formulas for cholesterol and cholesterol stearate, respectively.
Figure 1B:
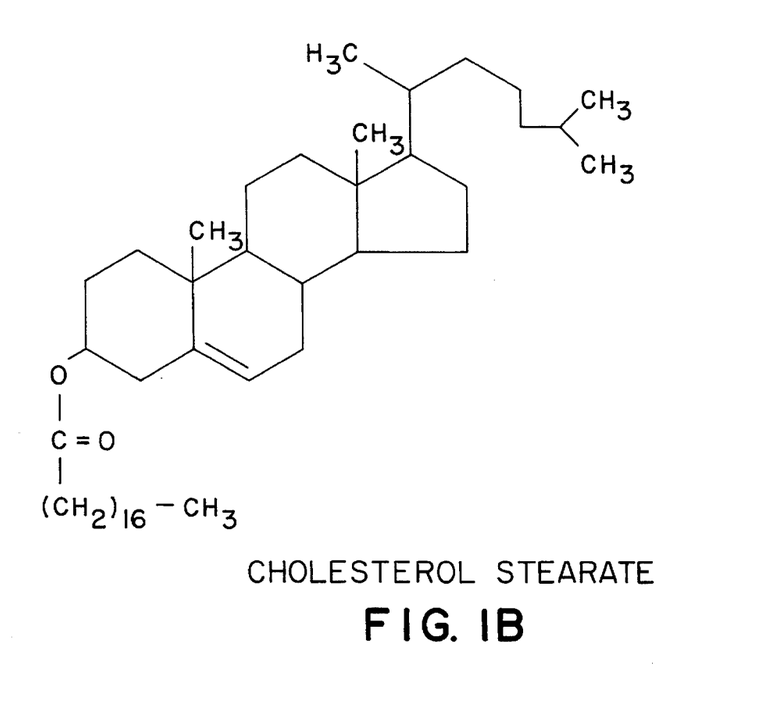

Cholesterol (FIG. 1A) has a number of key functions: it is an important component of the plasma membrane of cells where it influences membrane permeability and the activity of membrane-bound enzymes; cholesterol is a precursor of isoprenoids that are involved in control of cell proliferation, bile acids and vitamin D; cholesterol is also an obligatory precursor in the synthesis of a number of steroid hormones with key roles in controlling reproduction. Over 95% of yolk cholesterol is associated with the yolk LDL. The remainder is bound to lipovitellins. Although in recent years there has been considerable discussion about the adequacy of methods of measuring yolk cholesterol, there now seems to be general agreement that eggs from commercial flocks typically contain about 213 mg per egg (USDA, Nutrient content of foods, handbook 8-1, 137–145 (1991)). Most cholesterol in yolk is in non-esterified form, although about 20% is present as cholesterol esters in hens fed normal commercial diets. Cholesterol esters, such as the stearate shown in FIG. 1B, are core components of LDL and as such appear to be more amenable to manipulation than does non-esterified cholesterol.

Concern about the cholesterol content of the human diet has led to many attempts to reduce the cholesterol content of eggs. There have been a number of different approaches, including diet alterations, drugs, breeding, solvent extraction, enzyme conversion, supercritical fluid extraction and adsorption with saponins and β-cyclodextrin. The food industry has developed egg substitutes such as VIOBIN's (Viobin Corp., Monticello, Ill. 618956) desiccated defatted egg powder with the egg oil replaced by corn oil, or Fleischmann's "Egg Beaters" (Standard Brands Inc., New York, N.Y.) which contains only the egg white with other non-egg ingredients. Egg whites do not have the functional properties of egg yolk, so they are not good replacements.

Another approach is to reduce egg yolk cholesterol by processing treatments. Melnick (Melnick, D., U.S. Pat. No. 3,563,765 (1971)) treated dried egg yolk solids with hexane at a solvent to solid weight ratio of 3:1 at 80° F. for 30 min. The amount of fat and cholesterol extracted by this process was 70% of the total content of each in the egg yolk solids. Merchent et al (Merchent, Z. M., et al., U.S. Pat. No. 5,037,661 (1991)) extracted egg yolk solids with isopropyl alcohol and hydrolyzed the cholesterol depleted-yolk with selected proteolytic enzymes to increase the interfacial tension coefficient, such that the resulting product was useful in producing emulsified products such as mayonnaise and salad dressings. Frioriti et al (Frioriti, et al., U.S. Pat. No. 4,103,040 (1978)) used safflower oil to decholesterolize egg yolk using an oil to wet yolk weight ratio of 4% and high shear mixing. The yolk was extracted three times and 80 to 83% of the cholesterol was removed.

Supercritical extraction (SCE) is used commercially for decaffeination of coffee and tea. Supercritical carbon dioxide extraction was investigated for removal of cholesterol and lipid components from dried yolk by Froning et al (Froning, G. W., et al., J. Food Sci. 55:95–98 (1990)). The maximum reduction obtained was 66% of the total cholesterol and about 50% of the fat. Recently, the Nutra-Sweet Company introduced a SCE process that removed 95% of egg yolk cholesterol and 80% lipid (Singer, N. S., et al., Paper No. 63, presented at the 53rd Annual Meeting of Inst. of Food technologists, Chicago, Illinois, August 8–15 (1993)). A major disadvantage of solvent use is that it extracts fat along with cholesterol, and may denature proteins.

Researchers are experimenting with an enzyme, cholesterol reductase, that converts cholesterol in the presence of NADPH to coprostanol, which passes through the body without being absorbed (Dehal, S. S., et al., A Novel Method to Decrease the Cholesterol Content of Foods, Fat and Cholesterol Reduced Foods (1991)). The enzyme is not commercially available due to the extremely high extraction costs.

Cholesterol was removed by adsorption or clathrazation with β-cyclodextrin (β-CD). In France, Bayol et al. (Bayol, A., et al., European Patent 0,326,469 (1989)) used β-CD to reduce cholesterol in fresh egg yolk by 57%. Egg yolk was diluted 6 fold, mixed with β-CD and shaken for 5 hours in a water bath. The complexes (β-CD-cholesterol) were separated from the product by centrifugation. In the United States, a new reduced cholesterol egg product (80% cholesterol free) called "Simply Eggs" prepared using β-CD, was recently introduced by Crystal Farms.

Cyclodextrins are commercially available cyclic oligosaccharides obtained by enzymatic degradation of starch. They consist of six, seven, or eight glucose monomers arranged in a donut shaped ring, which are denoted alpha, beta or gamma cyclodextrin, respectively. Cyclodextrins are water soluble due to the location of free hydroxyl groups on the external rim of the molecule. Solubility is a function of temperature. The higher the temperature the higher the solubility. The solubility of β-cyclodextrins increases from 0.8% at 0.5° C. to 39.7% at 90° C. The internal cavity which is hydrophobic allows the cyclodextrins to complex molecules such as aromatic alcohols, fatty acids and their esters and cholesterol.

β-cyclodextrin has been used to reduce cholesterol in egg yolk for several reasons: 1. The relative size and geometry of the β-cyclodextrin internal cavity allowed good complexing with free and esterified cholesterol; 2. The realization of industrial scale production of β-cyclodextrin; 3. The intensive research on toxicity of β-cyclodextrin during the past decade, assured its safety as a food ingredient.

Six-month oral chronic toxicity of β-cyclodextrin (Szejtli, J., Industrial applications of cyclodextrins. Inclusion Compound 3:331–390 (1984)) was studied in rats by feeding up to 1.6 g/body weight kg/day and up to 0.6 g/body weight kg/day in dogs. Weight gain, food consumption and clinicobiochemical values were not affected. "β-cyclodextrin showed no embryo-toxic effect. Orally administered β-cyclodextrin can thus be considered a non-toxic substance (Szejtli, J., Industrial applications of cyclodextrins. Inclusion Compound 3:331–375 (1984))". β-cyclodextrin is allowed as a food ingredient in many countries, but not in the United States as yet.

OBJECTS

It is therefore an object of the present invention to provide an improved method for the reduction of cholesterol in egg materials using a cyclodextrin. In particular it is an object of the present invention to provide an improved method which is more effective in cholesterol reduction than the prior art methods and yet does not leave significant cyclodextrin residues in the egg material. These and other objects will become increasingly apparent by reference to the following description and the drawings.

DESCRIPTION OF PREFERRED EMBODIMENTS

The present invention relates to a method for removing cholesterol and esters thereof contained in an egg material selected from the group consisting of a whole egg and an egg yolk containing granules having a size by diluting the egg material with water, adjusting the pH of the egg material to provide an alkaline pH and adding a cyclodextrin to the egg material to precipitate a clathrate of the cyclodextrin with the cholesterol which is removed, adjusting the pH to a natural pH of the egg material and then separating or removing the water from the egg material, the improvement which comprises: adjusting the pH of the egg material to an alkaline pH between about 7.5 and 12 with an alkali metal hydroxide selected from the group consisting of potassium hydroxide and sodium hydroxide with stirring to provide an alkaline aqueous egg mixture; heating the alkaline aqueous egg mixture to a temperature between about 40° and 60° C. with a cyclodextrin in an amount between about 3 and 5 moles per mole of the cholesterol in the egg material to form the clathrate of the cyclodextrin and the cholesterol with mixing which reduces the size of the granules without producing a foam; cooling the aqueous egg mixture to precipitate the clathrate from the aqueous egg material; and separating the precipitated clathrate from the aqueous egg mixture to remove the cholesterol after adjusting the pH to the natural pH.

Further the present invention relates to a method for removing cholesterol contained in an egg material selected from the group consisting of a whole egg and an egg yolk which comprises: diluting the egg material with water in an amount between about 1.7 and 4 parts of the water to the egg material by weight on a dry basis for the egg material to provide an aqueous egg mixture; adjusting the pH of the egg material to an alkaline pH between about 7.5 and 12 with an alkali metal hydroxide selected from potassium hydroxide and sodium hydroxide with stirring to provide an alkaline aqueous egg mixture; heating the alkaline aqueous egg mixture to a temperature between about 40° and 60° C. to provide a heated egg mixture; mixing a cyclodextrin in the heated egg mixture in an amount between about 3 and 5 moles per mole of cholesterol in the egg material to form a clathrate of the cyclodextrin and the cholesterol with mixing which reduces the size of the granules without producing a foam; cooling the aqueous egg mixture to precipitate the clathrate from the aqueous egg material; separating the precipitated clathrate from the egg material; adjusting the pH of the egg material with a food grade acid to provide a natural pH of the egg material; and ultrafiltering the egg material after the pH adjustment to remove water and to provide a natural amount of water in the egg material.

The pH of the egg material is initially adjusted with potassium or sodium hydroxide to a pH between about 7.5 and 12, preferably 9 to 10.5. The pH adjustment allows the disassociation of the granules of the egg yolk.

The alkaline egg mixture is heated between 40° C. and 60° C., preferably 50° C., in order to clathrate the cholesterol and esters. The cyclodextrin is used in an amount between 3 and 5 moles per mole of the cholesterol, preferably 4.84 moles per mole of cholesterol.

It is important to vigorously mix the egg materials with the cyclodextrin. This disassociates the yolk granules and produces clathrazation in a reduced time, usually 1 to 20 minutes. This is preferably accomplished using a high speed multibladed mixer, although other mixers can be used. The speed of the blade is such that the aqueous solution is homogenized and the granules of the yolk are disassociated by the stirring action to expose the cholesterol for the clathrazation. Colloid mixers and other homogenizers can be used. The yield did not change appreciably between 1500 and 1800 RPM. The cholesterol reduction was best (95.5%) at 1500 to 1800 RPM and 8700×g centrifugation.

The alkaline egg mixture with the clathrated cholesterol is cooled. The cooling is between 0° and 10° C. to provide full precipitation of the clathrate. The clathrate is then removed, usually by centrifugation at between about 1000 and 8700× g.

One day-old eggs from Single Comb White Leghorn hens were obtained from the Michigan State University Poultry Farm, East Lansing, Mich. Liquid egg yolk was prepared by breaking the eggs by hand, the white was manually removed and the yolk was homogenized without foaming for 30 seconds using an Omnimixer homogenizer (Model 17105, Sorvall Instruments, Dupont, Claremont, Calif.) at a speed setting of 2 (2,000 RPM). Liquid egg yolk was divided into 2 groups, one group for treatment and the other for control.

Total lipids were extracted from control and reduced cholesterol liquid egg yolk by hexane-isopropanol (3:2) and quantified on a dry weight basis (Fletcher, D. L., et al., Poultry Sci. 63:1759–1763 (1984)). Moisture was determined using a convection oven by drying 5 g liquid egg yolk for 16 hr at 105° C. Total protein content was measured by the Kjeldahl method (925.31, AOAC, 1990) using a conversion factor of 6.25. Carbohydrates were gravimetrically determined by mass balance calculations (yolk carbohydrates=total yolk−(yolk protein+yolk water+yolk ash+yolk lipids)). The pH of liquid egg was determined at room temperature using a digital pH meter.

Cholesterol was extracted using hexane:isopropanol (Fletcher, D. L., et al., Poultry Sci. 63:1759–1763 (1984)) and saponified as described by Adams et al (Adams, L. M., et al., J. Assoc. Off. Anal. Chem. 66:844–846 (1986)).

The total cholesterol was quantified in underivatized form on a Hewlett Packard 5890A gas chromatograph (GC) (Avondale, Pa.) equipped with a flame ionization detector and a fused silica capillary column (15 m×0.53 nm) (J & W Scientific, Folsom, Calif.) coated with 0.15 µm film of DB-1 (100% methyl polysiloxane) (Monahan, et al., J. Agric. Food Chem. 40:1310 (1992)).

The yield was determined on dry weight basis. The yield was defined as the ratio of dried egg yolk solids after centrifugation to the ratio of dried egg yolk solids before centrifugation multiplied by 100.

Sponge cakes were prepared in triplicate as described by Norris and Cotterill (Norris, M. E., et al., Appendix II in Recommended Methods for Analysis of Eggs and Poultry Meat. North Central Regional Research Publication #307 (1986)) with one modification. Instead of using 64 g whole egg (15.36% solid content), 19.2 g diluted egg yolk having a moisture content of 76% and 44 g native egg white was used, so that the total solid content was 9.96%. Diluted egg yolk was used which was not demoisturized to its native value of 52%. The liquid whole egg was mixed with 44.7 g granulated sugar and 25.7 g cake flour. A 100 g batter were baked in a rectangular loaf pan in a preheated oven at 177° C. for 21 min. Sponge cake volumes were measured using the seed displacement method.

β-cyclodextrins residues were determined. A fresh phenolphthalein solution was prepared in advance (60 min) of the assay by mixing 0.5 mL 0.006M phenolphthalein (in ethanol) with 99.5 ml 1M $NaHCO_3$. The pH was adjusted to 10.5 with 5M KOH. Liquid egg was diluted 5 fold in distilled water. Then, 1.99 mL fresh phenolphthalein solution and 10 µl diluted egg yolk were added to a 3 mL cuvette, vortexed and the absorbency was determined at 546 nm. The β-cyclodextrin content of the egg yolk was determined by regression analysis. A standard curve using β-cyclodextrin standard solutions (0.25, 0.5, 0.75, and 1% β-cyclodextrin in distilled water) was established by plotting absorbency against β-cyclodextrin concentration.

The effects of centrifugal force (1080, 2000, 2500 and 8700×g) and cyclodextrin:cholesterol mole ratio (4.00 and 4.84) on cholesterol reduction and yield were studied in additional experiments.

Proximate composition and functional property analyses were done using 3 batches of control and reduced cholesterol egg yolk. Student's t tests were done to determine significant differences between control and reduced cholesterol liquid egg yolk. Statistical significance was declared at P<0.05.

EXAMPLE 1

Figure 2:
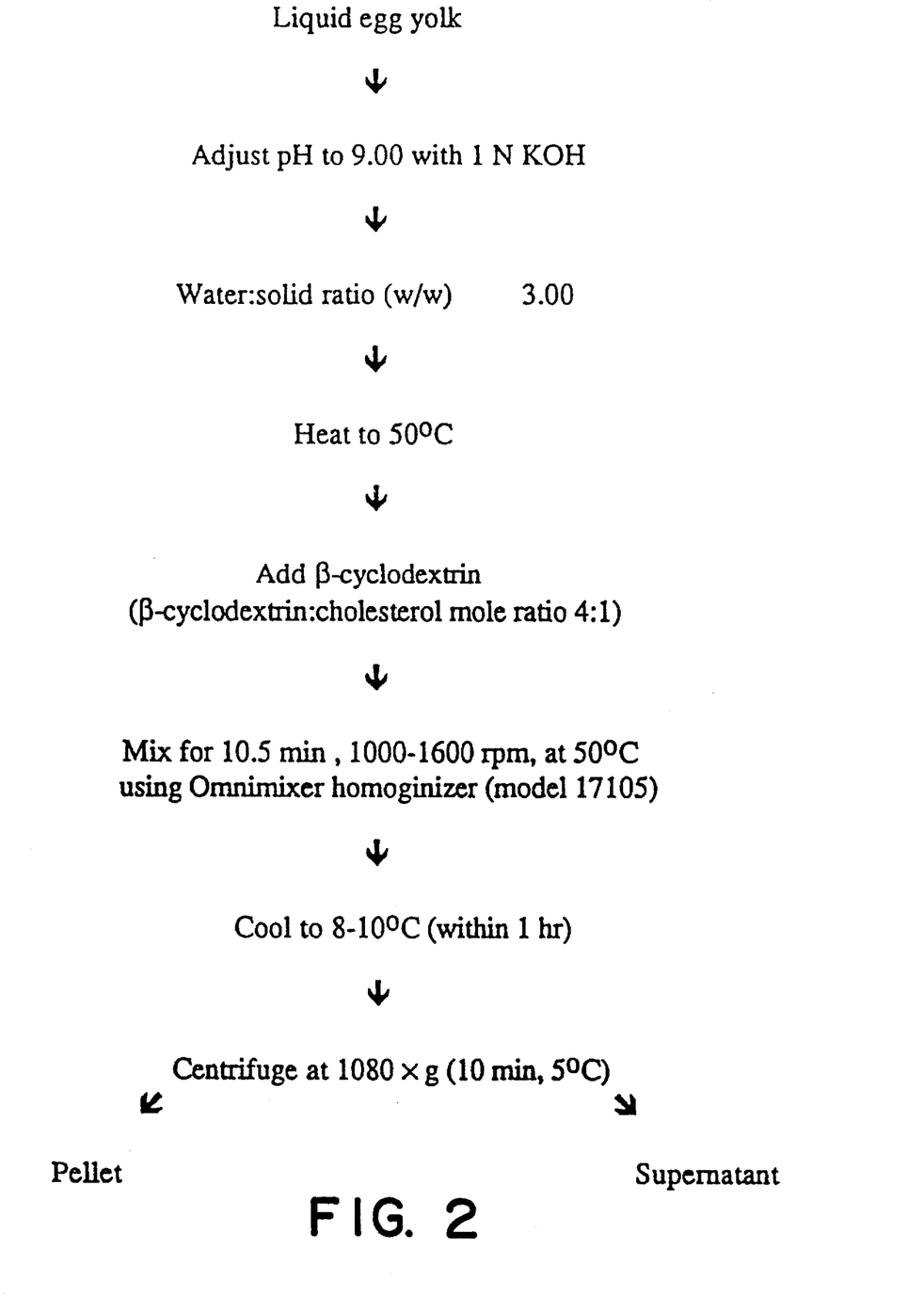
FIG. 2 is a schematic flow diagram for the method of the present invention.

The method developed for removal of cholesterol in this Example 1 from liquid egg yolk is outlined in FIG. 2. The rationale for each step in the process is described below. This method was tested with liquid egg yolk.

Dilution

The water-to-solid ratio is critical due to the ability of water to: 1) decrease the viscosity of egg yolk and allow better separation of insoluble cholesterol complexes; 2) increase the dissociation of α- and β-lipovitellins (Burley, R. W. and Cook, W. H., Can. J. Biochem. Physiol. 39:1295–1307 (1961)) and minimize their precipitation during the separation of complexes; 3) solubilize β-cyclodextrin (Szejtli, J., Industrial applications of cyclodextrins. Inclusion Compound 3:331–390 (1984)) and improve the formation of complexes; 4) decrease the coagulation temperature of egg proteins (Greenfield, C., U.S. Pat. No. 3,076,715 (1963)); 5) break the egg yolk emulsion (Vollbrecht et al., U.S. Pat. No. 5,063,077 (1991)). A water:solid weight ratio of 3 was used because a cholesterol reduction of 97% was observed. This is shown in Table 1.

TABLE 1

Effect of water:solid ratio on cholesterol reduction and yield of liquid egg yolk[a]

| Water:solid (w/w) | Cholesterol reduction (%) | Yield % |
| --- | --- | --- |
| 1.0 | 0.0 | 100 |
| 1.5 | 50.0 | 70 |
| 1.6 | 59.0 | 65 |
| 1.7 | 82.0 | 48 |
| 1.8 | 92.0 | 31 |
| 1.9 | 95.0 | 30 |
| 2.0 | 95.5 | 31 |
| 2.5 | 96.0 | 33 |
| 3.0 | 97.0 | 35 |

[a]Conditions: pH 5.45, mixing — 1600 rpm, 10 min, 50° C., centrifugation — 7700 × g, 10 min, 5° C., cooled to 15° C., and β-cyclodextrin:cholesterol mole ratio 4:1.

Heating

The solubility of β-cyclodextrin is a key factor because it allows for a homogeneous dispersion of β-cyclodextrin and therefore decreases mixing time. A temperature of 50° C. was selected to maximize β-cyclodextrin solubility, but prevent protein coagulation that occurs at 60° C. for liquid whole egg (Woodward, S. A. and Cotterill, O. J., J. Food Sci. 48:501 (1983)). The range of temperatures initially tested is shown in Table 2.

TABLE 2

Effect of heating temperature on cholesterol reduction and yield of liquid egg yolk[a]

| Temperature (°C.) | Cholesterol reduction (%) | Yield (%) |
| --- | --- | --- |
| 25 | 20 | 90 |
| 30 | 28 | 90 |
| 35 | 40 | 80 |
| 40 | 75 | 78 |
| 50 | 82 | 75 |

[a]Conditions: pH 9.0, Water:solid (w/w) — 3:1, centrifugation — 4000 × g, 10 min, 5° C., mixing — 1600 rpm, 10 min, β-cyclodextrin:cholesterol mole ratio 4:1, cooled to 15° C. The temperature of 50° C. was found to be optimum.

pH adjustment

The pH of egg yolk was adjusted to the alkaline side, with 1N KOH, to dissociate the granules, proteins, and lipoproteins and therefore minimize their losses during removal of β-cyclodextrin-cholesterol complexes by centrifugation. Causeret et al. (Causeret, D., et al., J. Food Sci. 56:1532–1536 (1991)) dissociated yolk granules at pH 9 and 3. Burley and Cook (Burley, R. W., et al., Can. J. Biochem. Physiol. 39:1295–1307 (1961)) isolated α- and β-lipovitellins from granules and dissociated them at pH 10.5 and 7.8, respectively. Seidman et al. (Seidman, W. E., et al., Poultry Sci. 43:406–417 (1962)) heated egg white at 58° C. for 5, 15, 30 and 60 minutes and observed minimum coagulation at pH 8.75. The range of pH initially tested is shown in Table 3. A pH of 9 was selected because we observed a yield of 95%.

TABLE 3

Effect of pH on cholesterol reduction and yield of liquid egg yolk[a]

| pH | Cholesterol reduction (%) | Yield (%) |
| --- | --- | --- |
| 3.00 | 0 | 100 |
| 5.46 | 85 | 35 |
| 7.22 | 68 | 78 |
| 9.00 | 72 | 95 |

[a]Conditions: water:solid (w/w) — 1.8:1, centrifugation — 2000 × g, 10 min, 5° C., mixing — 1600 rpm, 10 min, 50° C., cooled to 15° C., and β-cyclodextrin:cholesterol mole ratio 4:1.

Amount of β-cyclodextrin.

Theoretically 1 mole of β-cyclodextrin will complex 1 mole of compound (Szejtli, Industrial applications of cyclodextrins. Inclusion Compound 3:331–375 (1984)). Some larger molecular weight compounds may complex with more than one cyclodextrin molecule (Szjetli, 1984). A β-cyclodextrin:cholesterol molar ratio of 4 was used, because at this ratio an 83% reduction in cholesterol was observed, which was 3 times higher than that obtained at a ratio of 1. The range of β-cyclodextrin:cholesterol mole ratio initially examined is shown in Table 4.

TABLE 4

| β-cyclodextrin:cholesterol mole ratio | Cholesterol reduction (%) | Yield (%) |
| --- | --- | --- |
| 1 | 27 | — |
| 2 | 36 | — |
| 3 | 65 | — |
| 4 | 83 | 85 |

[a]Conditions: water:solid (w/w) — 3.0:1, centrifugation — 1080 × g, 10 min, 5° C., pH 9, mixing — 1600 rpm, 10 min, 50° C., cooled to 10° C.

Mixing

Shearing force is an important factor to assure contact between β-cyclodextrin and cholesterol, stabilize the oil-in-water emulsion, and help solubilize (disassociate) the grandles. As soon as the temperature reached 50° C, β-cyclodextrin was added and mixed for 10.5 minutes using an Omnimixer homogenizer (Model 17105) at a setting speed of 1 (1600 rpm). A shearing force below 1800 rpm was necessary to prevent foaming. The range of speeds and times initially tested are listed in Table 5. A shearing force of 1600×g for 10 minutes was used, because we observed 83.2% cholesterol reduction and 85.6% yield.

TABLE 5

Effect of shearing force and time on cholesterol reduction and yield of liquid egg yolk[a]

| Shearing force (rpm) | Time (min) | Cholesterol reduction (%) | Yield (%) |
| --- | --- | --- | --- |
| 800 | 10 | 82.1 | 80.4 |
| 800 | 30 | 78.3 | 70.7 |
| 1600 | 10 | 83.2 | 85.6 |

TABLE 5-continued

Effect of shearing force and time on cholesterol reduction and yield of liquid egg yolk[a]

| Shearing force (rpm) | Time (min) | Cholesterol reduction (%) | Yield (%) |
|---|---|---|---|
| 1600 | 30 | 76.4 | 72.1 |

[a]Conditions: pH 9, water:solid ratio (w/w) — 3:1, centrifugation — 1080 × g, 10 minutes, 5° C., mixing temperature 50° C., β-cyclodextrin:cholesterol mole ratio — 4:1, cooled to 10° C.

Cooling

The cooling step was used between mixing and centrifugation. Liquid egg yolk was cooled to 8°–10° C. within 1 hour to stabilize the complexes and recrystallize the free β-cyclodextrin in solution. The free β-cyclodextrins in the diluted egg yolk exist in two states: soluble and crystallized. The free soluble β-cyclodextrins in diluted egg yolk crystalize when their concentration exceeds the saturation concentration. The solubility or saturation concentration is function of temperature with more β-cyclodextrin being soluble at higher temperatures. A supersaturated β-cyclodextrin solution was developed by cooling the diluted yolk sufficiently (8°–10° C.) so that the concentration exceeded the solubility. The range of cooling temperatures tested is shown in Table 6.

TABLE 6

Effect of temperature on the composition of reduced cholesterol liquid egg yolk (per 100 g dry matter)[a]

| Temperature °C. | | Lipid (%) | Protein (%) | Carbohydrate (%) | Ash (%) |
|---|---|---|---|---|---|
| Mixing | Cooling | | | | |
| Control | | 64.14 | 31.83 | 0.67 | 3.36 |
| 25 | 10 | 49.59 | 26.16 | 20.02 | 4.12 |
| 50.7 | 10 | 51.53 | 25.17 | 19.53 | 3.77 |
| 50.7 | 25 | 48.84 | 25.65 | 21.58 | 3.92 |
| 50.7 | 2 | 48.02 | 24.89 | 23.28 | 3.80 |

[a]Conditions: β-cyclodextrin:cholesterol mole ratio — 4.84:1, mixing — 1600 rpm, 6.5 min, water:solid weight ratio — 2.9:1, centrifugation — 2000 × g, 10 min, 5° C.

Separation of Complexes

Insoluble complexes and recrystallized free β-cyclodextrin were separated by centrifugation. Centrifugation was fast and efficient. At a centrifugal force of 1080×g for 10 min at 5° C., we observed a 83% reduction in cholesterol with smallest losses (14%) in yield. The range of centrifugal force initially tested is shown in Table 7.

TABLE 7

Effect of centrifugal force on cholesterol reduction and yield of liquid egg yolk[a]

| Centrifugal force (× g) | Cholesterol reduction (%) | Yield (%) |
|---|---|---|
| 750 | 62 | 90 |
| 1080 | 70 | 86 |
| 1400 | — | 82 |
| 2000 | — | 80 |
| 3000 | — | 78 |

[a]Conditions: pH 9.0, water:solid (w/w) — 3:1, mixing — 1600 rpm, 10 min, 5° C., centrifugation — 10 min, 5° C., β-cyclodextrin: cholesterol mole ratio — 4:1, cooled to 15° C.

EXAMPLE 2

The optimization of the combined effects of the independent variables (pH, β-cyclodextrin, dilution, mixing time, and temperature) on cholesterol reduction and yield was accomplished using response surface methodology. Two responses were measured: cholesterol reduction % ($y_1$) was defined as the ratio of the total amount of cholesterol in the sample to the total amount of cholesterol in the control multiplied by 100; Yield % ($Y_2$) was defined as the ratio of the dry weight of the supernatant to the egg yolk initial dry weight (before centrifugation) multiplied by 100. Based on preliminary experiments, the five independent variables, shown in Table 8, were water: solid weight ratio, pH, β-cyclodextrin: cholesterol molar ratio, mixing time, and temperature. The other important independent variables were held fixed: time and temperature of centrifugation (1080×g, 10 min, 5° C.) cooling temperature and time (8°–10° C., 1 hr), and shearing force (1800 rpm). The experimental design adopted was a 5 factor, 5 level rotatable central composite design.

TABLE 8

Variables and their levels for rotatable central composite design used in the process optimization

| Variable | Symbol | Coded-variable levels | | | | |
|---|---|---|---|---|---|---|
| | | −2.378 | −1 | 0 | +1 | +2.378 |
| Water:solid (w/w)[a] | $X_1$ | 2.61 | 2.90 | 3.11 | 3.33 | 3.61 |
| pH | $X_2$ | 5.40 | 7.50 | 9.00 | 10.50 | 12.50 |
| β-cyclodextrin:cholesterol mole ratio | $X_3$ | 2.00 | 3.15 | 4.00 | 4.84 | 6.00 |
| Mixing Time (min) | $X_4$ | 1.00 | 6.50 | 10.50 | 14.50 | 20.00 |

TABLE 8-continued

Variables and their levels for rotatable central composite design used in the process optimization

| Variable | Symbol | Coded-variable levels | | | | |
|---|---|---|---|---|---|---|
| | | −2.378 | −1 | 0 | +1 | +2.378 |
| Temperature (°C.) | $X_5$ | 40.00 | 44.40 | 47.50 | 50.70 | 55.00 |

[a]Water:solid (w/w) after pH adjustment

The coded values of independent variables were −2.378 (lowest level), −1.0 (medium level), 1.0, and 2.378 (highest level) (Box, G. E. and Hunter, JoS., Ann. Math. Stat. 28:195–241 (1957)). For each independent variable studied, the central value (0) was chosen according to the preliminary study. The complete design shown in Table 9 consisted of 43 experimental points which included the center (0, 0, 0, 0, 0), 10 axial points (± 2.378,0,0,0,0) and 32 corner points.

TABLE 9

Rotatable central composite design arrangement and responses

| Run | Variable levels[a] | | | | | Responses[b] | |
|---|---|---|---|---|---|---|---|
| | $X_1$ | $X_2$ | $X_3$ | $X_4$ | $X_5$ | $Y_1$ | $Y_2$ |
| 1 | 0 | 0 | 0 | 0 | 0 | 83.97 | 85.91 |
| 2 | −2.378 | 0 | 0 | 0 | 0 | 60.47 | 90.29 |
| 3 | 0 | −2.378 | 0 | 0 | 0 | 86.24 | 52.39 |
| 4 | 0 | 0 | −2.378 | 0 | 0 | 38.51 | 85.06 |
| 5 | 0 | 0 | 0 | −2.378 | 0 | 82.38 | 83.31 |
| 6 | 0 | 0 | 0 | 0 | −2.378 | 78.77 | 96.17 |
| 7 | +2.378 | 0 | 0 | 0 | 0 | 83.66 | 74.71 |
| 8 | 0 | +2.378 | 0 | 0 | 0 | Gelatinized | |
| 9 | 0 | 0 | +2.378 | 0 | 0 | 76.95 | 9.50 |
| 10 | 0 | 0 | 0 | +2.378 | 0 | 85.56 | 100.50 |
| 11 | 0 | 0 | 0 | 0 | +2.378 | 83.75 | 96.36 |
| 12 | +1 | +1 | −1 | −1 | −1 | 74.93 | 85.04 |
| 13 | +1 | +1 | +1 | −1 | −1 | 89.46 | 95.70 |
| 14 | +1 | +1 | +1 | +1 | −1 | 90.13 | 93.11 |
| 15 | +1 | +1 | +1 | +1 | +1 | 91.07 | 75.77 |
| 16 | +1 | +1 | −1 | +1 | −1 | 70.88 | 101.08 |
| 17 | +1 | +1 | −1 | −1 | +1 | 69.10 | 94.13 |
| 18 | +1 | +1 | +1 | −1 | +1 | 91.09 | 89.35 |
| 19 | +1 | +1 | −1 | +1 | +1 | 69.27 | 100.30 |
| 20 | +1 | −1 | −1 | −1 | −1 | 66.49 | 89.53 |
| 21 | +1 | −1 | +1 | −1 | −1 | 88.09 | 92.04 |
| 22 | +1 | −1 | +1 | +1 | −1 | 90.19 | 71.07 |
| 23 | +1 | −1 | +1 | +1 | +1 | 90.15 | 70.27 |
| 24 | +1 | −1 | −1 | +1 | −1 | 70.76 | 94.82 |
| 25 | +1 | −1 | −1 | −1 | +1 | 68.74 | 83.49 |
| 26 | +1 | −1 | +1 | −1 | +1 | 90.69 | 78.09 |
| 27 | +1 | −1 | −1 | +1 | +1 | 73.45 | 93.04 |
| 28 | −1 | +1 | −1 | −1 | −1 | 67.45 | 102.34 |
| 29 | −1 | +1 | +1 | −1 | −1 | 87.23 | 108.33 |
| 30 | −1 | +1 | +1 | +1 | −1 | 87.80 | 102.79 |
| 31 | −1 | +1 | +1 | +1 | +1 | 89.19 | 107.77 |
| 32 | −1 | +1 | −1 | +1 | −1 | 62.92 | 105.45 |
| 33 | −1 | +1 | −1 | −1 | +1 | 65.38 | 101.14 |
| 34 | −1 | +1 | +1 | −1 | +1 | 89.15 | 108.78 |
| 35 | −1 | +1 | −1 | +1 | +1 | 65.77 | 103.32 |
| 36 | −1 | −1 | −1 | −1 | −1 | 62.16 | 90.25 |
| 37 | −1 | −1 | +1 | −1 | −1 | 84.51 | 98.26 |
| 38 | −1 | −1 | +1 | +1 | −1 | 84.77 | 94.91 |
| 39 | −1 | −1 | +1 | +1 | +1 | 86.16 | 91.06 |
| 40 | −1 | −1 | −1 | +1 | −1 | 60.66 | 92.89 |
| 41 | −1 | −1 | −1 | −1 | +1 | 62.45 | 87.37 |
| 42 | −1 | −1 | +1 | −1 | +1 | 85.49 | 94.98 |
| 43 | −1 | −1 | −1 | +1 | +1 | 63.32 | 90.12 |

[a]Coded variables
[b]$Y_1$ is cholesterol reduction (%). $Y_2$ is Yield (%) defined as supernatant dry weight/initial egg yolk dry weight × 100

Analysis of Variance

Software packages were used for analysis of variance and to fit the second order models (SAS Institute, Inc., SAS User's Guide, Version 5, Cary, NC (1985)) and generate response surface plots (Axum Technical Graphics and Data Analysis. Version 3.0, TriMetrix, Inc., Seattle, Wash. (1993)). The model proposed for each response (Y) was:

$$Y = B_o + \sigma B_i X_i + \Sigma B_{ii} X_i^2 + \Sigma B_{ij} X_i X_j$$

where $B_o$, $B_i$, $B_{ii}$, $B_{ij}$ are constant and regression coefficients of the model, and $X_i$ the independent variables in coded values. The criteria for eliminating a variable from the full regression was based on $R^2$ values and the significance of f-test. Results of the analysis of variance of each of the responses with their corresponding coefficient of multiple determination ($R^2$) and coefficient of variation (CV) are shown in Table 10.

TABLE 10

Parameter estimates and analysis of variance of the second order polynomial regression for 5 factors and 2 responses (cholesterol reduction ($Y_1$) and Yield ($Y_2$)).

| | $Y_1$ | | $Y_2$ | |
|---|---|---|---|---|
| Source | Coefficient | Prob > \|T\| | Coefficient | Prob > \|T\| |
| Constant | −854.62 | <.001 | −541.24 | .726 |
| $X_1$ | 365.73 | <.001 | 293.59 | .537 |
| $X_2$ | 5.05 | .559 | 21.87 | .631 |
| $X_3$ | 73.68 | <.001 | 156.57 | .040 |
| $X_4$ | −1.34 | .625 | 3.10 | .830 |
| $X_5$ | 6.42 | .296 | −8.84 | .782 |
| $X_1^2$ | −49.05 | <.001 | −23.31 | .736 |
| $X_2^2$ | .37 | .231 | −.86 | .586 |
| $X_3^2$ | −6.63 | <.001 | −10.36 | .024 |
| $X_4^2$ | <.01 | .930 | .03 | .851 |
| $X_5^2$ | .05 | .362 | .13 | .665 |
| $X_1 X_2$ | −1.74 | .242 | −3.78 | .626 |
| $X_1 X_3$ | −4.53 | .092 | −18.42 | .189 |
| $X_1 X_4$ | .38 | .493 | −.20 | .944 |
| $X_1 X_5$ | −.33 | .640 | −1.28 | .728 |
| $X_2 X_3$ | −.06 | .864 | .49 | .802 |
| $X_2 X_4$ | −.09 | .253 | .10 | .795 |
| $X_2 X_5$ | −.09 | .373 | .14 | .789 |
| $X_3 X_4$ | .03 | .820 | .98 | .192 |
| $X_3 X_5$ | .11 | .514 | −.34 | .711 |
| $X_4 X_5$ | .02 | .579 | <.01 | .991 |
| $R^2$ | .975 | | .659 | |
| F ratio | 42.331 | | 2.036 | |
| prob F | <.001 | | .05 | |
| CV (%) | 3.42 | | 15.49 | |

$$Y = B_o + \sum_{i=1}^{3} B_i X_i + \sum_{i=1}^{3} B_{ii} X_i^2 + \sum_{i=1}^{3} B_{ij} X_i X_j$$

From the analysis of the F values and $R^2$, only 3 independent variables (pH, β-cyclodextrin:cholesterol mole ratio, water::solid weight ratio) out of five appeared to influence the responses. In fact, despite the exclusion of time and temperature from the model, the $R^2$ remained very high (0.967) and F-test significant to <0.001. The estimated regression coefficients for ($Y_1$) and ($Y_2$) and the results of significance test on the coefficient for the three selected factors are indicated in Table 11.

TABLE 11

Parameter estimates and analysis of variance of the second order polynomials regression for 3 factors and two responses (cholesterol reduction ($Y_1$) and Yield ($Y_2$))

| | $Y_1$ | | $Y_2$ | |
|---|---|---|---|---|
| Source | Coefficient | Prob > ∣T∣ | Coefficient | Prob > ∣T∣ |
| Constant | −610.76 | <.001 | −831.74 | .100 |
| $X_1$ | 321.07 | <.001 | 337.09 | .207 |
| $X_2$ | −2.04 | .731 | 35.76 | .217 |
| $X_3$ | 76.93 | <.001 | 138.27 | .003 |
| $X_1^2$ | −43.78 | <.001 | −40.44 | .322 |
| $X_2^2$ | .46 | .040 | −1.19 | .264 |
| $X_3^2$ | −6.30 | <.001 | −11.43 | .001 |
| $X_1X_2$ | −1.74 | .210 | −3.78 | .570 |
| $X_1X_3$ | −4.53 | .071 | −18.42 | .125 |
| $X_2X_3$ | −.06 | .855 | .49 | .771 |
| $R^2$ | | .967 | | .614 |
| F ratio | | 105.100 | | 5.666 |
| prob F | | <.001 | | .001 |
| CV (%) | | 3.22 | | 13.35 |

$$Y = B_o + \sum_{i=1}^{3} B_i X_i + \sum_{i=1}^{3} B_{ii} X_i^2 + \sum_{i=1}^{3} B_{ij} X_i X_j$$

The model for cholesterol reduction ($Y_1$) was considered adequate and usable with satisfactory $R^2$ value (0.967) and significant F-test at <0.001. The model for yield ($Y_2$) was considered approximate, despite the significance of the F-test, due to its low $R^2$ value (0.614). This model could be used for trend analysis. The estimated $Y_1$ and $Y_2$ values using the model are reported in Table 12. The mean and standard deviation for the estimated and actual values for cholesterol reduction were 77.1%±12.7 and 77.4%±12.2, respectively, and the standard error of estimate was 2.98. The relationships between independent and dependent variables are represented by the three dimensional response surfaces generated by model equations enveloped from the statistical analysis.

Figure 3:
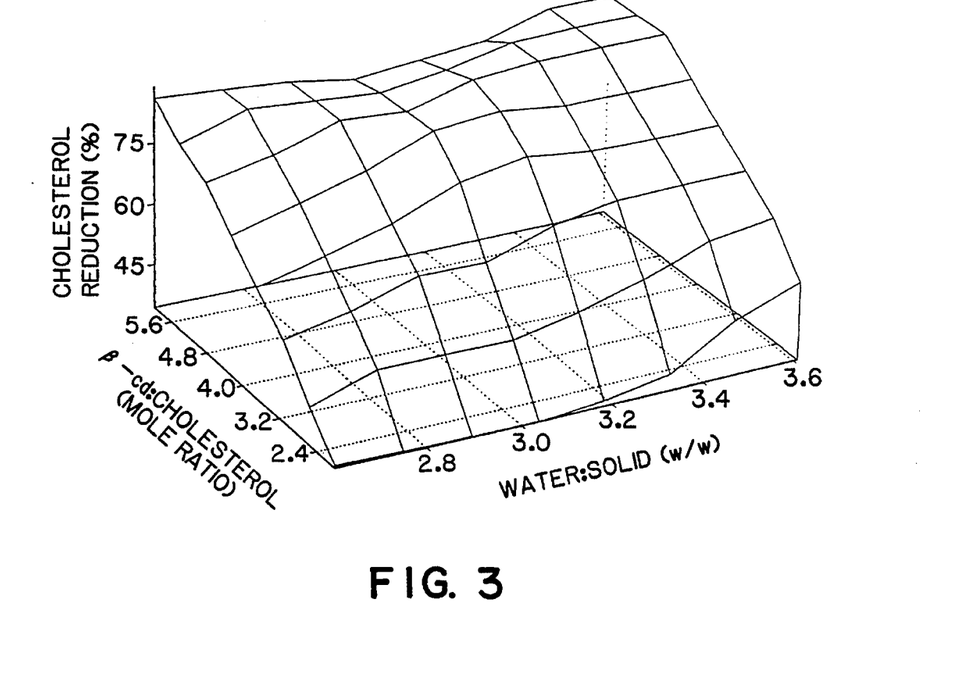
FIG. 3 is a graph of a response surface methodology for percent cholesterol reduction ($y_1$) of liquid egg yolk at pH 9.0 using β-cyclodextrin (β-CD).
Figure 4:
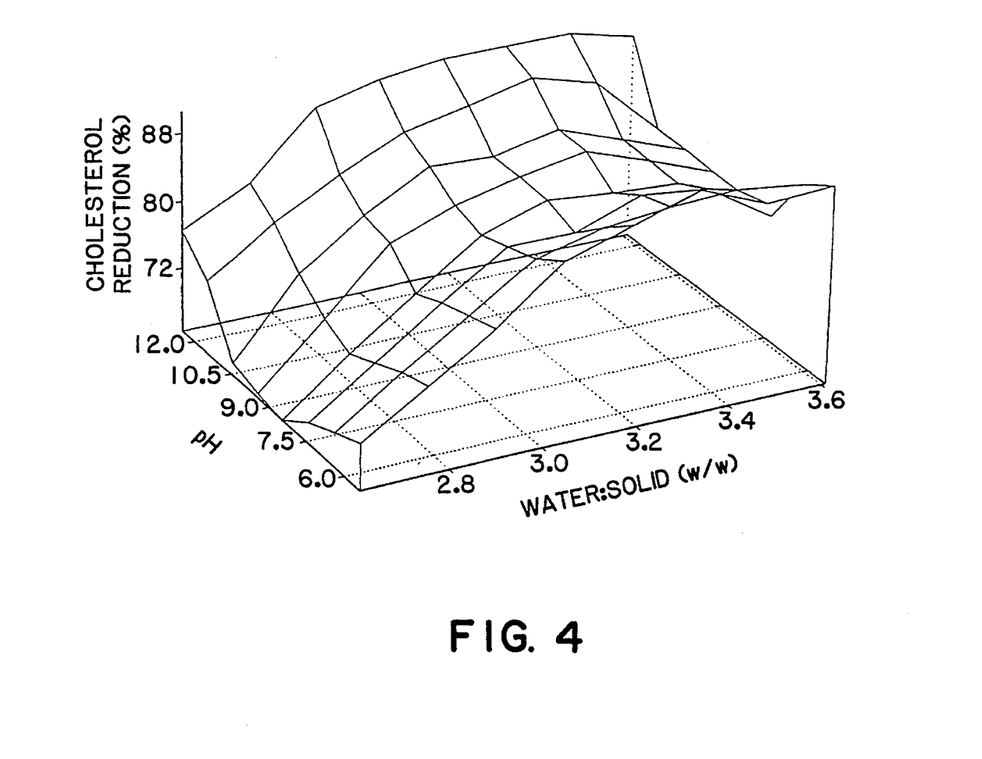
FIG. 4 is a graph of a response surface methodology for percent cholesterol reduction ($Y_1$) of liquid egg yolk at β-cyclodextrin: cholesterol mole ratio of 4:1.

Cholesterol reduction increased with increased $H_2O$ and β-cyclodextrin (FIG. 3). However, use of large quantities of water and β-cyclodextrin are not recommended, due to their negative impacts on other responses such as yield and β-cyclodextrin residues in the final product. The pH also had a significant quadratic effect on $Y_1$, but the effect of pH was only observed in association with water:solid weight ratio and β-cyclodextrin:cholesterol mole ratio (FIG. 4). The temperature and mixing time within the experimental domain had no significant effect.

TABLE 12

Reduction of cholesterol in egg yolk using response surface methodology

| H2O | pH | B-cd | Estimated | Actual | Actual − Estimat. |
|---|---|---|---|---|---|
| 3.11 | 9 | 4 | 82.92736 | 83.97 | 1.042638 |
| 2.61 | 9 | 4 | 64.49316 | 60.47 | −4.023162 |
| 3.11 | 5.4 | 4 | 86.77 | 86.24 | −0.530002 |
| 3.11 | 9 | 2 | 33.92396 | 38.51 | 4.586038 |
| 3.11 | 9 | 4 | 82.92736 | 82.38 | −0.547362 |
| 3.11 | 9 | 4 | 82.92736 | 78.77 | −4.157362 |
| 3.61 | 9 | 4 | 79.47156 | 83.66 | 4.188438 |
| 3.33 | 12.5 | 4 | 90.45896 | Gelatinized | — |
| 3.33 | 9 | 6 | 80.71386 | 76.95 | −3.763858 |
| 3.33 | 9 | 4 | 84.10366 | 85.56 | 1.456342 |

TABLE 12-continued

Reduction of cholesterol in egg yolk using response surface methodology

| H2O | pH | B-cd | Estimated | Actual | Actual − Estimat. |
|---|---|---|---|---|---|
| 3.33 | 9 | 4 | 84.10366 | 83.75 | −0.353658 |
| 3.33 | 10.5 | 3.15 | 71.70277 | 74.93 | 3.227227 |
| 3.33 | 10.5 | 4.84 | 90.08676 | 89.46 | −0.626762 |
| 3.33 | 10.5 | 4.84 | 90.08676 | 90.13 | 0.043238 |
| 3.33 | 10.5 | 4.84 | 90.08676 | 91.07 | 0.983238 |
| 3.33 | 10.5 | 3.15 | 71.70277 | 70.88 | −0.822773 |
| 3.33 | 10.5 | 3.15 | 71.70277 | 69.1 | −2.602773 |
| 3.33 | 10.5 | 4.84 | 90.08676 | 91.09 | 1.003238 |
| 3.33 | 10.5 | 3.15 | 71.70277 | 69.27 | −2.432773 |
| 3.33 | 7.5 | 3.15 | 70.93237 | 66.49 | −4.442373 |
| 3.33 | 7.5 | 4.84 | 89.62056 | 88.09 | −1.530562 |
| 3.33 | 7.5 | 4.84 | 89.62056 | 90.19 | 0.569438 |
| 3.33 | 7.5 | 4.84 | 89.62056 | 90.15 | 0.529438 |
| 3.33 | 7.5 | 3.15 | 70.93237 | 70.76 | −0.172373 |
| 3.33 | 7.5 | 3.15 | 70.93237 | 68.74 | −2.192373 |
| 3.33 | 7.5 | 4.84 | 89.62056 | 90.69 | 1.069438 |
| 3.33 | 7.5 | 3.15 | 70.93237 | 73.45 | 2.517627 |
| 2.9 | 10.5 | 3.15 | 64.9169 | 67.45 | 2.5331 |
| 2.9 | 10.5 | 4.84 | 86.59284 | 87.23 | 0.63716 |
| 2.9 | 10.5 | 4.84 | 86.59284 | 87.8 | 1.20716 |
| 2.9 | 10.5 | 4.84 | 86.59284 | 89.19 | 2.59716 |
| 2.9 | 10.5 | 3.15 | 64.9169 | 62.92 | −1.9969 |
| 2.9 | 10.5 | 3.15 | 64.9169 | 65.38 | 0.4631 |
| 2.9 | 10.5 | 4.84 | 86.59284 | 89.15 | 2.55716 |
| 2.9 | 10.5 | 3.15 | 64.9169 | 65.77 | 0.8531 |
| 2.9 | 7.5 | 3.15 | 61.9019 | 62.16 | 0.2581 |
| 2.9 | 7.5 | 4.84 | 83.88204 | 84.51 | 0.62796 |
| 2.9 | 7.5 | 4.84 | 83.88204 | 84.77 | 0.88796 |
| 2.9 | 7.5 | 4.84 | 83.88204 | 86.16 | 2.27796 |
| 2.9 | 7.5 | 3.15 | 61.9019 | 60.66 | −1.2419 |
| 2.9 | 7.5 | 3.15 | 61.9019 | 62.45 | 0.5481 |
| 2.9 | 7.5 | 4.84 | 83.88204 | 85.49 | 1.60796 |
| 2.9 | 7.5 | 3.15 | 61.9019 | 63.32 | 1.4181 |
| Sums | | | 3240.92 | 3249.16 | 8.24 |

Figure 5:
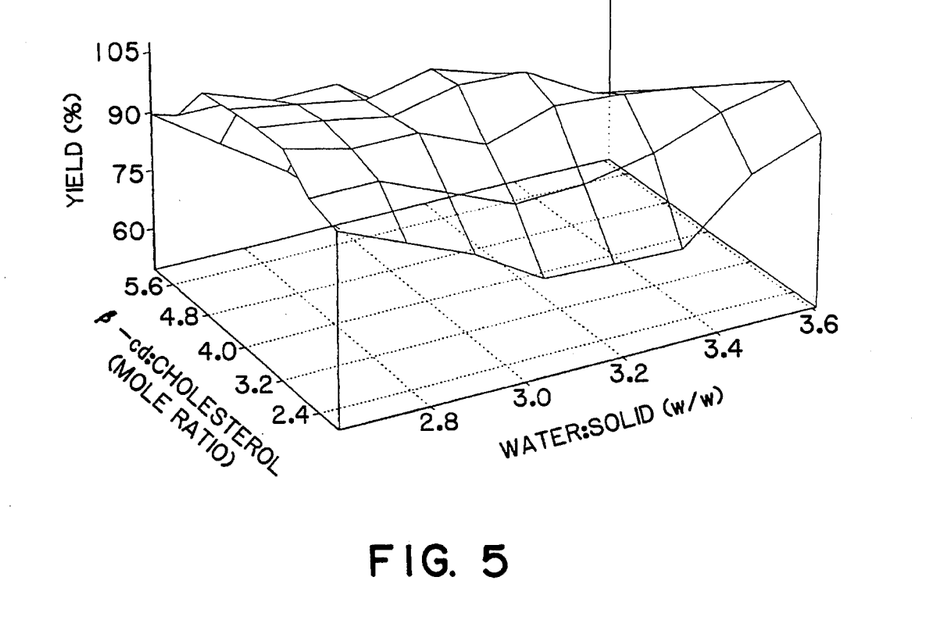
FIG. 5 is a graph of a response surface methodology for percent yield ($Y_2$) of liquid egg yolk at pH 9.0 treated β-cyclodextrin (β-cd).
Figure 6:
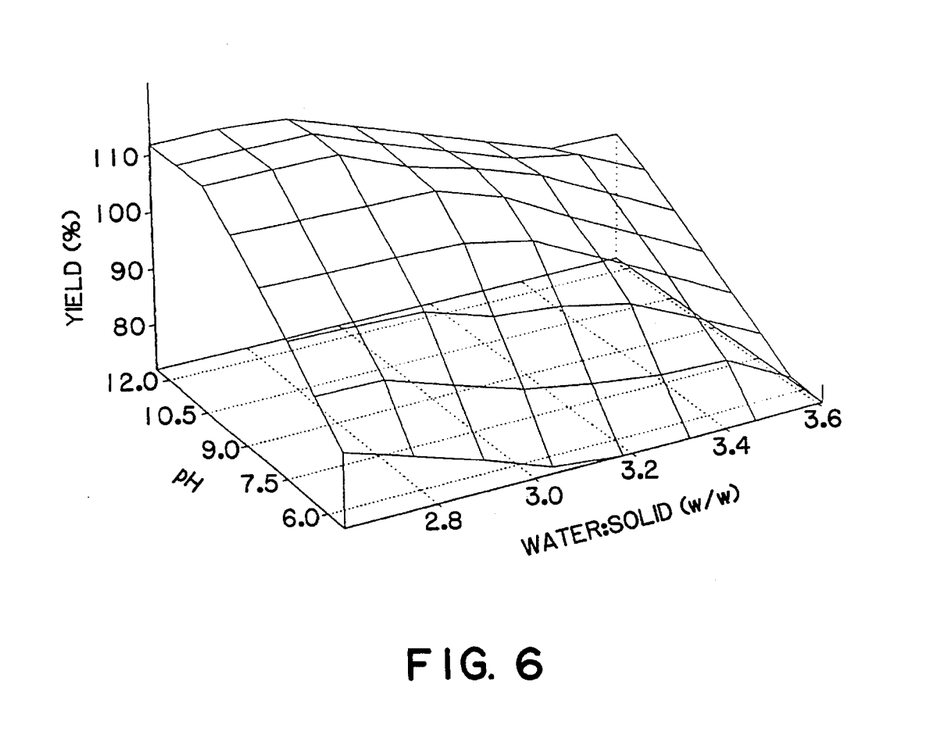
FIG. 6 is a graph of a response surface methodology for percent yield ($Y_2$) of liquid egg yolk at β-cyclodextrin:cholesterol mole ratio of 4:1.

Solid:water weight ratio ($X_1$) had a significant effect on yield. The higher the water:solid ratio the lower the yield (FIG. 5). This can be explained by the effect of water on egg viscosity. A high water:solid ratio decreased the viscosity of the egg yolk, which facilitated precipitation of granules during centrifugation and therefore decreased the yield. The pH also had a significant effect on yield. A basic pH coupled with high shear mixing (1500–1800 rpm) dissociated granules and lipoproteins and therefore improved the yield (FIG. 6). The selected treatment which resulted in the best responses corresponded to run 34 (Table 12).

The joint effect of water:solid weight ratio (2.9), β-cyclodextrin:cholesterol mole ratio (4.84), and the basic pH (10.5) used in experiment 34, reduced egg yolk cholesterol by 89.1% with a yield of 108.8%. Further optimization of the selected treatment (run 34) for these factors may explain the variation in yield.

Causeret et al (1991) reported that granules could be completely dissociated at either acid or alkaline pH (3 and 9, respectively). The dissociation of granules in the presence of β-cyclodextrin appear to be different. In preliminary experiments it was found that pH in the presence of β-cyclodextrin did not completely dissociate the granules as indicated by a low yield. A shearing force of 1500 to 1800 rpm at pH 10.5 was necessary to dissociate the granules. Two different mixing devices were tried: stirring with a magnetic stirrer and stir bar at a rate just to form vortex and an Omnimixer homogenizer (Model 17105) at a speed of 1500 to 1800 rpm. Yields of 69.1% and 59.75% were obtained using the Omnimixer homogenizer and the magnetic stirrer, respectively. The difference in yield (9.4%) was significant. Mechanical force at high shear rate (1500 to 1800 rpm) helped to dissociate the granules at pH 10.5 in the presence of β-cyclodextrin.

The centrifugal force, which was not considered in the model, is another important factor affecting cholesterol reduction ($Y_1$) and yield ($Y_2$). When the centrifugal force was increased from 1080×g to 8700×g, $Y_1$ increased by 6.2% and $Y_2$ decreased by 39.7% (TABLE 13). The higher the centrifugal force the lower the yield.

The β-cyclodextrin:cholesterol molar ratio also had a significant effect on the yield. Yield increased with increased β-cyclodextrin:cholesterol mole ratio (Table 13). This was due to an increase of β-cyclodextrin residue in the supernatant rather than to egg yolk components. This is a major disadvantage affecting the quality of the final product, as β-cyclodextrins are expensive and not allowed as a food ingredient in the United States.

TABLE 13

Effect of β-cyclodextrin:cholesterol mole ratio on the composition of reduced cholesterol liquid egg yolk (dry weight basis)

| $X_3$[a] | Lipid (%) | Protein (%) | Carbohydrate (%) | Ash (%) | Cholesterol reduction (%) | Yield (%) | β-cd residues[b] (%) |
|---|---|---|---|---|---|---|---|
| control | 65.1[c] | 31.06[c] | 0.48[c] | 3.35[c] | N/A | N/A | N/A |
| 4.84 | 62.5[d] | 29.64[d] | 3.34[d] | 4.51[d] | 95.38[c] | 69.11 | 3.21[c] |
| 4.00 | 64.1[e] | 30.23[c] | 0.96[e] | 4.66[cd] | 86.46[d] | 71.82[c] | not detectable |

[c,d,e]Means with different superscripts in the same column are significantly different ($P < 0.05$).
[a]$X_3$ Coded variable representing β-cyclodextrin:cholesterol molar ratio.
[b]Determined by the phenol method (Ball, 1993).
N/A not applicable

TABLE 14

Effect of centrifugal force on yield and composition (dry weight basis) of reduced cholesterol liquid egg yolk

| Force (×g) | Lipid (%) | Protein (%) | Carbohydrate (%) | Ash (%) | Yield (%) | Cholesterol Reduction (%) |
|---|---|---|---|---|---|---|
| 1080 | 47.2[c] | 24.5[c] | 24.7[a] | 3.6[c] | 108.8[a] | 89.2[b] |
| 2000 | 51.5[b] | 25.2[bc] | 19.5[b] | 3.8[bc] | 100.0[b] | 90.9[b] |
| 2500 | 51.1[b] | 26.7[b] | 18.1[b] | 4.1[b] | 86.7[c] | 90.1[b] |
| 8700 | 62.5[a] | 29.6 | 3.3[c] | 4.5[a] | 69.1[d] | 95.4[a] |

[a,b,c,d]Means with different superscripts in the same column are significantly different ($P < 0.05$).

Using the phenol method no β-cyclodextrin residues were detected at β-cyclodextrin:cholesterol molar ratio of 4.00, but the cholesterol reduction $Y_1$ was low (86.5%). In contrast, at β-cyclodextrin:cholesterol molar ratio of 4.84, the cholesterol reduction was high (95.4%), but the β-cyclodextrin residues detected in the supernatant were 3.2%. Residues can be removed from the supernatant by enzyme treatment. Cully (U.S. Pat. No. 4,980,180 (1990)) developed a process for removing β-cyclodextrin from egg yolk or egg yolk plasma.

Taking into consideration the three responses studied, it was found that the objectives (high cholesterol reduction, high yield, and low β-cyclodextrin residues) were accomplished (TABLE 14), but at a centrifugal force of 8700×g for 10 min at 5° C. The final process is outlined in FIG. 7. The method developed is simple, efficient, and cost-effective compared to other methods developed for cholesterol reduction. Cholesterol was reduced by 95.4%.

EXAMPLE 3

Figure 7:
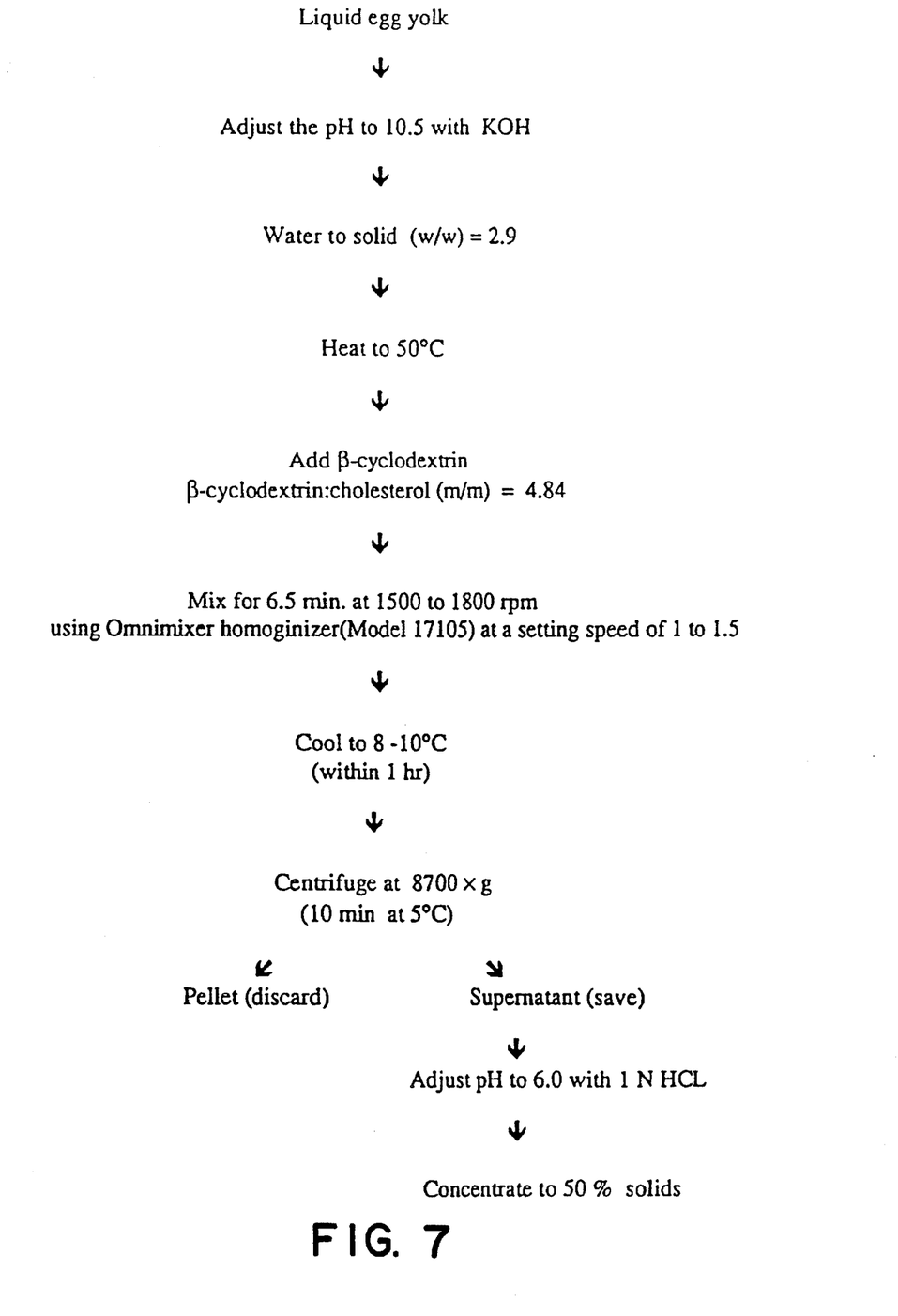
FIG. 7 is a schematic flow diagram of the preferred method of the present invention.

The method of FIG. 7 was used on whole liquid egg to reduce the total cholesterol by 80%. All of the method steps remained the same as in liquid egg yolk, except the diluting agent. Egg white was used instead of distilled water to dilute the native yolk, so that the water:solid (w/w) after pH adjustment to 10.5 remained unchanged at 2.9. The advantage of using egg white as a diluting agent instead of distilled water is economic. By using egg white, the concentration step can be reduced or eliminated.

The pH of the supernatant was adjusted to its native value with 1 N HCl, to reassociate the granules and lipoproteins. The moisture can be reduced to the original value by ultrafiltration, spray drying, or vacuum concentration. The cholesterol reduction was 86.4% and the yield was 68.6%.

Baking tests were conducted on both control and reduced cholesterol egg yolk. There was no significant difference ($P<0.05$) in sponge cake volume and visually the texture was similar.

The method of the present invention has a number of attributes which results in considerable and practical advantages over alternative cholesterol-reduction technologies. The method is efficient and removes 95.4% of the total egg yolk cholesterol, which was 15 to 20% higher than that reported by Bayol et al (1989) and Vollbrecht et al (1991) using the same complexing and diluting agents. Unlike Vollbrecht et al (1991), it is not necessary to first separate the egg yolk granules and later recombine them to egg yolk plasma. The joint effect of pH and shearing force of this process dissociated the egg yolk granules and prevented their precipitation upon centrifugation. The mixing temperature of 50° C. used in the present method decreased the encapsulation time of egg yolk total cholesterol to 6.5 min or less, which was 1 and 5 hr for Vollbrecht et al (1991) and Bayol et al (1989) methods, respectively. The method does not require expensive specialized capital equipment. It requires only heating and mixing followed by centrifugation.

β-cyclodextrin is allowed as a food ingredient in many countries. In the U.S., β-cyclodextrin may be approved as a food ingredient by 1994. However, the process leaves no detectable β-cyclodextrin residues at β-cyclodextrin:cholesterol mole ratio of 4:1 corresponding to a 86.5% cholesterol reduction.

It is intended that the foregoing description be only illustrative of the present invention and that the present invention be limited only by the hereinafter appended claims.

We claim:
1. In a method for removing cholesterol and esters thereof contained in an egg material selected from the group consisting of a whole egg and an egg yolk containing granules having a size by diluting the egg material with water, adjusting the pH of the egg material to provide an alkaline pH and adding a cyclodextrin to the egg material to pre- cipitate a clathrate of the cyclodextrin with the cholesterol which is removed, adjusting the pH to a natural pH of the egg material and then separating removing the water from the egg material, the improvement which comprises:

(a) adjusting the pH of the egg material to an alkaline pH between about 7.5 and 12 with an alkali metal hydroxide selected from the group consisting of potassium hydroxide and sodium hydroxide with stirring to provide an alkaline aqueous egg mixture;

(b) heating the alkaline aqueous egg mixture to a temperature between about 40° and 60° C. with a cyclodextrin in an amount between about 3 and 5 moles per mole of the cholesterol in the egg material to form the clathrate of the cyclodextrin and the cholesterol with mixing which reduces the size of the granules without producing a foam;

(c) cooling the aqueous egg mixture to precipitate the clathrate from the aqueous egg material; and (d) separating the precipitated clathrate from the aqueous egg mixture to remove the cholesterol after adjusting the pH to the natural pH.

2. The method of claim 1 wherein the pH in step (a) is about pH 9 to 10.5.

3. The method of claim 1 wherein the heating temperature in step (b) is about 50° C.

4. The method of claim 1 wherein the mole ratio of cyclodextrin to cholesterol in step (b) is about 4: 1.

5. The method of claim 1 wherein the cooling in step (c) is to about 0° to 10° C.

6. The method of claim 1 wherein in step (d) the separating is by centrifugation of the egg material.

7. The method of claim 1 wherein the pH in step (a) is about pH 9.0, wherein the temperature in step (b) is about 50° C., wherein the mole ratio of cyclodextrin to cholesterol in step (b) is about 4:1 and wherein the mixing is for 1 to 20 minutes, wherein the cooling in step (c) is to about 0° to 10° C., and wherein in step (d) the separating is by centrifugation of the egg material.

8. The method of claim 1 wherein the mixing is with a homogenizer.

9. A method for removing cholesterol contained in an egg material selected from the group consisting of a whole egg and an egg yolk which comprises:

(a) diluting the egg material with water in an amount between about 1.7 and 4 parts of the water to the egg material by weight on a dry basis for the egg material to provide an aqueous egg mixture;

(b) adjusting the pH of the egg material to an alkaline pH between about 7.5 and 12 with an alkali metal hydroxide selected from potassium hydroxide and sodium hydroxide with stirring to provide an alkaline aqueous egg mixture;

(c) heating the alkaline aqueous egg mixture to a temperature between about 40° and 60° C. to provide a heated egg mixture;

(d) mixing a cyclodextrin in the heated egg mixture in an amount between about 3 and 5 moles per mole of cholesterol in the egg material to form a clathrate of the cyclodextrin and the cholesterol with mixing which reduces the size of the granules without producing a foam;

(e) cooling the aqueous egg mixture to precipitate the clathrate from the aqueous egg material;

(f) separating the precipitated clathrate from the egg material;

(g) adjusting the pH of the egg material with a food grade acid to provide a natural pH of the egg material; and (h) ultrafiltering the egg material after the pH adjustment to remove water and to provide a natural amount of water in the egg material.

10. The method of claim 9 wherein the pH in step (a) is about pH 9 to 10.5.

11. The method of claim 9 wherein the heating temperature in step (b) is about 50° C.

12. The method of claim 9 wherein the mole ratio of cyclodextrin to cholesterol in step (b) is about 4:1.

13. The method of claim 9 wherein the cooling in step (c) is to about 0° to 10° C.

14. The method of claim 9 wherein in step (d) the separating is by centrifugation of the egg material.

15. The method of claim 9 wherein the pH in step (a) is about pH 9.0, wherein the temperature in step (b) is about 50° C., wherein the mole ratio of cyclodextrin to cholesterol in step (b) is about 4:1, wherein the cooling in step (c) is to about 0° C. to 10° C., and wherein in step (d) the separating is by centrifugation of the egg material.

16. The method of claim 9 wherein the water in step (a) is added in admixture with egg whites.

17. The method of claim 9 wherein the mixing is with a multibladed mixer at 1500 to 1800 RPM.

* * * * *

UNITED STATES PATENT AND TRADEMARK OFFICE
CERTIFICATE OF CORRECTION

PATENT NO. : 5,484,624
DATED : January 16, 1996
INVENTOR(S) : Aziz C. Awad and Denise Smith

It is certified that error appears in the above-indentified patent and that said Letters Patent is hereby corrected as shown below:

Column 8, line 28, "Szjetli" should read --Szejtli--.

Column 11, line 14, "JoS." should read --J.S.--.

Column 12, line 20, "$Y = B_0 \sigma$" should read -- $Y = B_0 + \Sigma$ --.

Column 15, line 42 (Table 14), last line, "29.6" should read --$29.6^a$--.

Column 18, line 29 (Claim 11), "step (b)" should read --step (c)--.

Column 18, line 27 (Claim 10), "step (a)" should read --step (b)--.

Column 18, line 32 (Claim 12), "step (b)" should read --step (d)--.

UNITED STATES PATENT AND TRADEMARK OFFICE
CERTIFICATE OF CORRECTION

PATENT NO. : 5,484,624
DATED : January 16, 1996
INVENTOR(S) : Aziz C. Awad and Denise Smith It is certified that error appears in the above-indentified patent and that said Letters Patent is hereby corrected as shown below:

Column 18, line 33 (Claim 13), "step (c) should read --step (e)--.

Column 18, line 35, (Claim 14), "step (d)" should read --step (f)--.

Column 18 (Claim 15), "step (a)" should read --step (b)--; "step (b)" should read --step (c)--; "step (b)" should read --step (d)--; "step (c)" should read --step (e)--; "step (d)" should read --step (f)--.

Signed and Sealed this

Twenty-eighth Day of January, 1997

Attest:

BRUCE LEHMAN

Attesting Officer      Commissioner of Patents and Trademarks